Jan. 30, 1968     J. W. COOPER     3,366,415
TEACHING TABLE
Filed Feb. 14, 1966     2 Sheets-Sheet 1
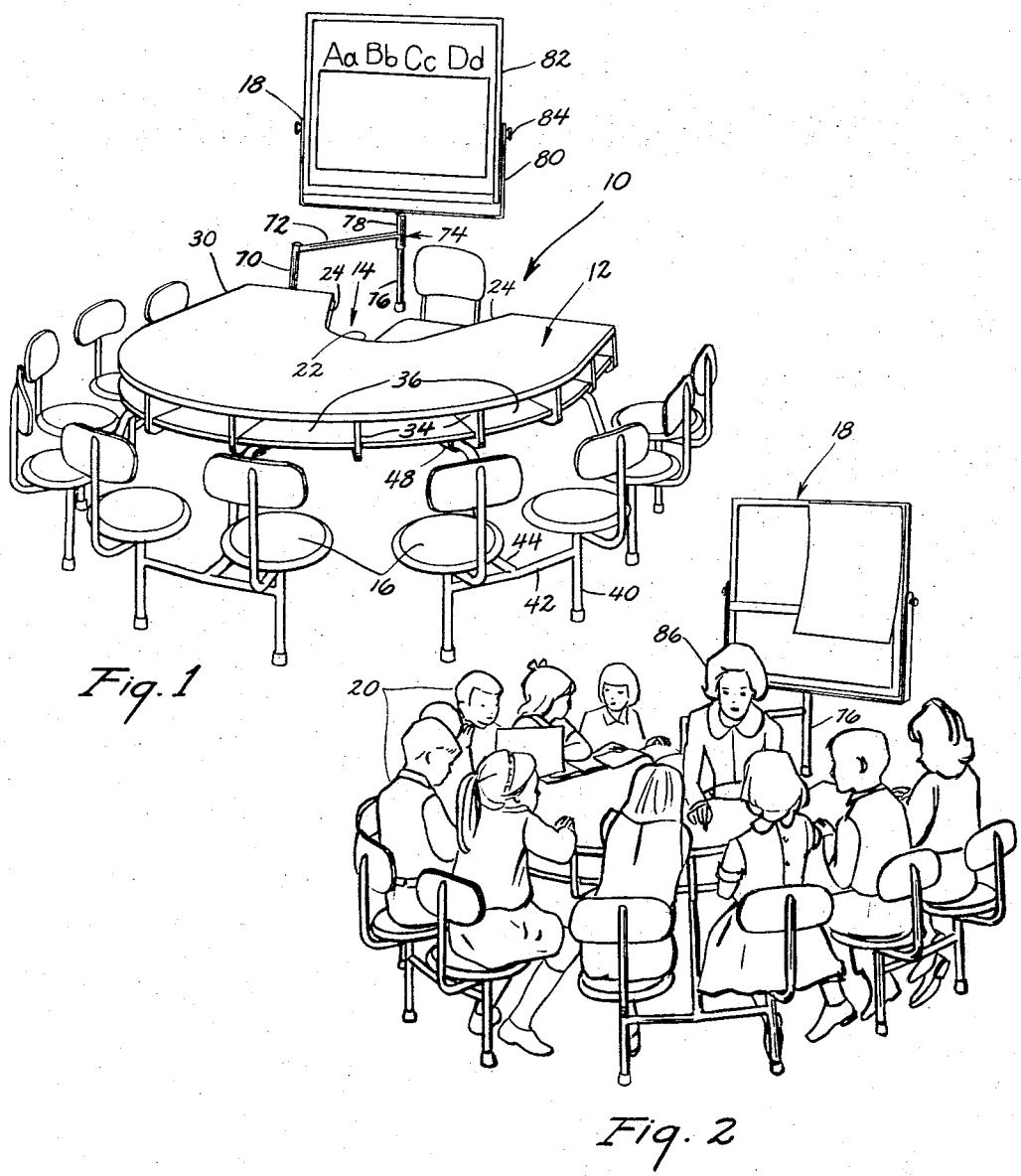
INVENTOR.
JAMES W. COOPER
BY
Dick, Zarley, McKee & Thomte
ATTORNEYS Jan. 30, 1968 J. W. COOPER 3,366,415
TEACHING TABLE
Filed Feb. 14, 1966 2 Sheets-Sheet 2
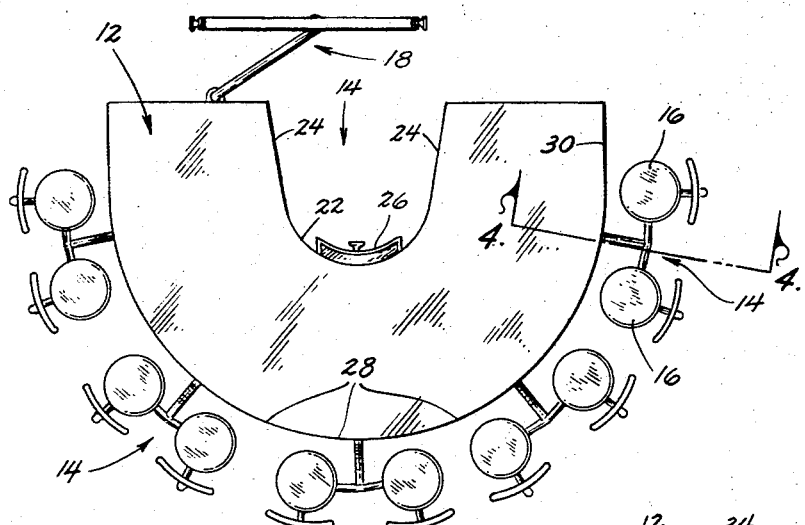
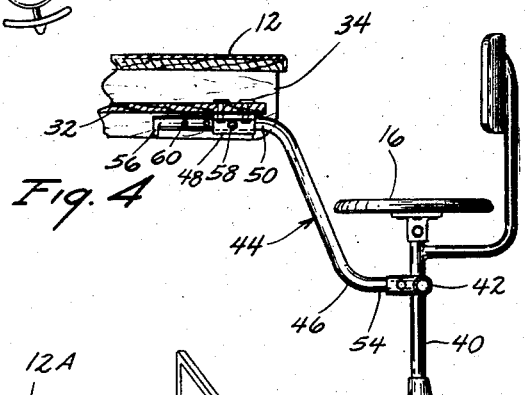
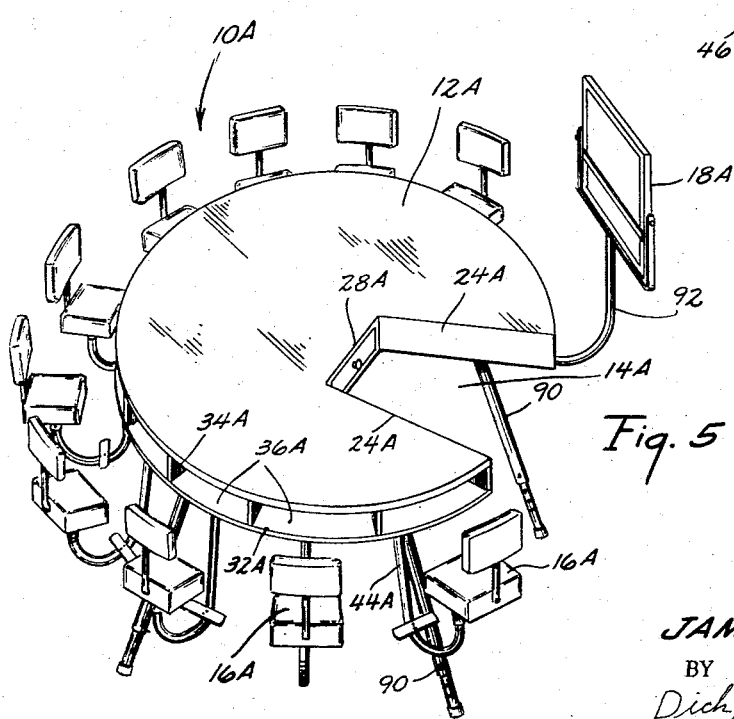
INVENTOR.
JAMES W. COOPER
BY
Dick, Zarley, McKee & Thomte
ATTORNEYS United States Patent Office 3,366,415
Patented Jan. 30, 1968

3,366,415
TEACHING TABLE
James W. Cooper, 611 South N St.,
Indianola, Iowa 50125
Filed Feb. 14, 1966, Ser. No. 527,207
8 Claims. (Cl. 297—157)

This invention relates to a table and in particular to a table having a teaching station with student stations therearound.

In the primary grades, kindergarten through the third grade, the teacher will sit in the center of a group of children who will be sitting on the floor or on conventional chairs. The students' and the teacher's books and papers must be held or placed on the floor. Much of the student's time and effort is spent trying to maintain the study materials in an orderly arrangement and consequently communication between the student and the teacher is impaired.

The teaching table of this invention is designed to provide a cut-away portion in the table for a teaching station and student stations around the periphery of the table. The teaching station becomes the focal point of the student's attention. The books and papers being used by the student and teacher may be placed on top of the teaching table. Other supplies may be placed in individual storage compartments below the table top. The table top will have a surface area of such a size that the teacher will be substantially an equal distance from each of the students whereby each student may receive equal attention. The size of the table also is such that the teacher may reach each of the work areas on the top of the table to demonstratively help the students. Moreover, the size of the table is such that all space is utilized by either the teacher or the students. At the teacher's side, a display panel may be mounted which will be readily visible by all of the students around the table.

The chair structure is designed to support the table top through the chair legs and includes a plurality of arms extending from the bottom of the table and connecting to an arm extending between a pair of chairs having individual legs. The chairs may be moved towards or away from the table as desired.

By connecting the chairs to the table a minimum amount of noise will result from activity of the children since the table may be designed to place the teacher at the desired distance from all of the students. A lower conversational voice may be used by all in the group. It is also seen that the children are uniformly spaced around the teacher and that each child has ample space for full participation in study and teaching exercises.

The table also makes it possible to utilize a display panel which may be placed within easy reach of the teacher. The table may also be used as a desk as storage space is provided for each student as well as the teacher.

It has been found that the language art skills which include reading, writing and spelling may be most effectively taught using the teaching table of this invention. The table has also been found to be useful in a similar manner for middle grade classes, fourth grade through sixth grade and is believed to have substantial use possibilities for higher grades.

This invention therefore consists of the construction, arrangements, and combination of the various parts of the device, whereby the purposes contemplated are attained as hereinafter more fully set forth, specifically pointed out in the claims and illustrated in the accompanying drawings, in which:

FIG. 1 is a perspective view of the teaching table of this invention;

FIG. 2 is a view similar to FIG. 1 but showing the table being used by a teacher and ten primary grade students;

FIG. 3 is a top plan view of the table as shown in FIG. 1;

FIG. 4 is a cross-sectional elevational view taken along line 4—4 in FIG. 3; and FIG. 5 is a perspective view of an alternate embodiment of this invention.

The teaching table of this invention is referred to in FIG. 1 generally by the reference numeral 10. A table top 12 is provided which is U-shaped along its outer peripheral edge. A recessed area 14 is provided between the legs of the U-shaped table top and functions as a teaching station. A plurality of chairs 16 are secured to the table top 12 around the periphery thereof. A display panel 18 is mounted near the teaching station 14 for viewing by all of the students 20 illustrated in FIG. 2.

The inner end of the recess 14 is arcuate and terminates at its ends in outwardly flared side portions 24. A storage drawer 26 is provided under the table top 12 for the teacher.

The outer edge of the table is arcuate along its center area and is shown at 28 and terminates at its ends in parallel sides 30 which extend on opposite sides of the recessed area 14. The inner end 22 of the recessed area 14 is substantially equal distance from the outer peripheral edge of the table top 12 including the straight side portions 30 and the arcuate area 28.

A shelf 32 is provided under the table top 12 and secured thereto by a plurality of peripherally spaced apart sections 34 which function to define a plurality of storage compartments 36. The section members 34 also serve to strengthen the table top 12. The table 10 as illustrated is designed to optimumly seat ten children. Five separate seating units have been provided, each of which include two chairs 16. Each chair 16 is provided with a leg 40 which is interconnected by the cross-bar portion 42 of a T-shaped member 44 having a staff 46 extending to the underside of the table top 12 where it is telescopically received in a female member 48. The staff member 46 includes a first portion 50 disposed in a horizontal plane under the shelf 32 and is connected to a downwardly extending portion 52 which is connected to an outwardly extending portion 54 also disposed in a horizontal plane and which is connected to the center of the cross member 42. A stop element 56 is provided on the inner end of the first portion 50 to limit the outward movement of the chair unit 44 within the female member 48. A pin 58 is provided for selectively locking the first arm portion 50 in the desired extended position relative to the table top 12. A plurality of holes 60 are formed in the first arm portion 50 to receive the pin 58. It is seen that the table top 12 is supported by the legs 40 of the chair units 14 and thus the entire area under the table top 12 is unobstructed.

The display panel 18 is mounted between the outer peripheral straight edge 30 and the flaring edge 24 of the recess 14 and includes an upright member 70 which is adapted to rotate relative to the table top 12 and is connected to a horizontally extending arm 72 which in turn is connected to a vertically disposed member 74 having a handle portion 76 below the horizontal member 72 and an upstanding portion 78 extending above the member 72. The upright portion 78 is in turn connected to a U-shaped panel support frame 80 which pivotally holds a display panel 82 for pivotal movement about a horizontal axis 84. It is seen that a teacher 86 in FIG. 2 may easily reach the handle portion 76 to position the display panel 18 as desired.

An alternate embodiment of this invention is shown in FIG. 5 and is referred to as table 10A and has a substantially circular table top 12A. A recess 14A is formed in the table top 12A from the outer peripheral edge and is defined by a straight inner end 28A which connects with outwardly flaring side edges 24A.

Extendable table legs 90 are provided for directly supporting the table top 12A and chairs 16A are individually supported by J-shaped arms 44A connected to the bottom side of a shelf 32A. The space between the shelf 32A and the table top 12A is divided into two compartments 36A by section members 34A.

A display panel 18A is provided and is connected to the bottom shelf 32A by a J-shaped support arm 92.

It is thus seen that with the teaching table design of this invention it is apparent that the teacher can work most effectively with each and every student grouped around the table. The teaching sessions can be conducted with a minimum of fatigue since the teacher has all of her teaching aids within easy reach and may reach each and every one of the students. Likewise, the students are comfortable as they have adequate space for reading and writing and a place to place their books and materials not being used.

Some changes may be made in the construction and arrangement of my teaching table without departing from the real spirit and purpose of my invention, and it is my intention to cover by my claims, any modified forms of structure or use of mechanical equivalents which may be reasonably included within their scope.

I claim:
1. A teaching table comprising,
   a solid table top having an outer peripheral edge,
   a first portion of said table top being substantially in the shape of a semi-circle so that a portion of said peripheral edge is substantially semi-circular in shape,
   a second portion of said table top opposite to said semi-circular portion and having an open recess therein extending from the outer peripheral edge of said table top to a point only sufficiently beyond the radial center of said semi-circular portion to make the radial width of said table top substantially constant so that a person positioned within said recess at substantially the center of said semi-circular portion will be substantially centrally located with respect to, and substantially equi-distant from, all points on the outer periphery of said semi-circular portion of said table top.

2. The structure of claim 1 and a plurality of chairs secured to said table top and positioned around the periphery of said table top.

3. The structure of claim 1 and a shelf secured to said table top and spaced therebelow, a plurality of peripherally spaced apart sections extending between said shelf and said table top dividing said space therebetween into a plurality of compartments.

4. The structure of claim 2 wherein said table top has support legs, and said table top and said chairs are completely supported by said legs.

5. The structure of claim 1 wherein said recess is defined by side edges which diverge outwardly from the inner end of said recess.

6. The structure of claim 1 wherein said inner end of said recess extends along a substantially straight line and merges at its ends into said diverging side edges.

7. The structure of claim 1 and a plurality of chairs positioned around the outer peripheral edge of said table top, adjustable means connecting said chairs to the under side of said shelf for selectively moving said chairs towards and away from the plane of said table top.

8. The structure of claim 1 and a visual aid structure is positioned adjacent the outer end of said recess and means securing said visual aid to said table top.

References Cited

UNITED STATES PATENTS

| | | | |
|---|---|---|---|
| 564,044 | 7/1896 | Berkneyer | 297—170 |
| 623,143 | 4/1899 | Doty | 108—50 |
| 808,318 | 12/1905 | Thomas et al. | 108—50 |
| 1,349,710 | 8/1920 | Beeson | 211—10 |
| 1,818,606 | 8/1931 | Burks | 312—239 |
| 2,560,001 | 7/1951 | Scholfield et al. | 312—239 X |
| 2,660,504 | 11/1953 | Bridge | 312—239 |
| 3,160,451 | 12/1964 | Lewis | 211—144 X |
| 3,226,154 | 12/1965 | Allen | 297—157 X |

FOREIGN PATENTS

| | | |
|---|---|---|
| 803,572 | 7/1936 | France. |
| 1,052,320 | 6/1953 | France. |
| 1,174,036 | 11/1958 | France. |
| 178,811 | 11/1906 | Germany. |
| 782,931 | 9/1957 | Great Britain. |
| 549,724 | 10/1956 | Italy. |

JAMES T. McCALL, *Primary Examiner.*